(12) United States Patent
Nishio et al.

(10) Patent No.: US 9,337,599 B2
(45) Date of Patent: May 10, 2016

(54) CARBON BRUSH FOR FUEL PUMP AND METHOD FOR MANUFACTURING SAME

(75) Inventors: Makoto Nishio, Matsusaka (JP); Shinya Nakagawa, Matsusaka (JP); Kiyotoshi Oi, Kariya (JP); Youichi Murakami, Kariya (JP); Takashi Fukutsuka, Kariya (JP); Ryouichi Honbo, Kariya (JP)

(73) Assignees: Denso Corporation, Kariya-shi, Aichi (JP); TRIS Inc., Matsusaka, Mie (JP)

( * ) Notice: Subject to any disclaimer, the term of this patent is extended or adjusted under 35 U.S.C. 154(b) by 311 days.

(21) Appl. No.: 13/981,172

(22) PCT Filed: Dec. 15, 2011

(86) PCT No.: PCT/JP2011/079067
§ 371 (c)(1),
(2), (4) Date: Jul. 23, 2013

(87) PCT Pub. No.: WO2012/101924
PCT Pub. Date: Aug. 2, 2012

(65) Prior Publication Data
US 2013/0300251 A1    Nov. 14, 2013

(30) Foreign Application Priority Data

Jan. 27, 2011  (JP) .................... 2011-014803

(51) Int. Cl.
| H02K 13/10 | (2006.01) |
| H01R 39/02 | (2006.01) |
| H01R 39/22 | (2006.01) |
| H02K 5/12 | (2006.01) |
| H02K 13/00 | (2006.01) |

(52) U.S. Cl.
CPC .............. *H01R 39/025* (2013.01); *H01R 39/22* (2013.01); *H02K 5/12* (2013.01); *H02K 13/00* (2013.01)

(58) Field of Classification Search
CPC ............................. H02K 13/00; H02K 13/10
USPC ......................................... 310/253, 248–252
See application file for complete search history.

(56) References Cited

U.S. PATENT DOCUMENTS

| 4,929,404 A * | 5/1990 | Takahashi ................ C10C 3/00 |
| | | 208/44 |
| 2002/0082320 A1 * | 6/2002 | Sarkis ..................... B29C 71/04 |
| | | 523/220 |
| 2005/0151441 A1 | 7/2005 | Ito et al. |
| 2010/0133948 A1 | 6/2010 | Namikoshi et al. |

FOREIGN PATENT DOCUMENTS

| CN | 101647179 A | 2/2010 |
| JP | 63334 A | 1/1988 |
| JP | 63283449 A | 11/1988 |

(Continued)

OTHER PUBLICATIONS

Machine translation of JP2000201455A (Jul. 2000).*

(Continued)

*Primary Examiner* — Michael Andrews
(74) *Attorney, Agent, or Firm* — The Webb Law Firm

(57) ABSTRACT

A carbon brush for a fuel pump includes a brush body and a lead wire connected to the brush body, and the brush body has carbon and polyether ether ketone as main components. Abnormal wear does not occur even if a fuel pump motor is operated at a high voltage.

9 Claims, 2 Drawing Sheets

(56) References Cited

FOREIGN PATENT DOCUMENTS

| | | | |
|---|---|---|---|
| JP | 6426344 A | 1/1989 | |
| JP | 1313867 A | 12/1989 | |
| JP | 10134921 A | 5/1998 | |
| JP | 2000201455 A | 7/2000 | |
| JP | 2000201455 A * | 7/2000 | ............. H02K 13/00 |
| JP | 2005204387 A | 7/2005 | |
| JP | 2007300748 A | 11/2007 | |
| JP | 2008043028 A | 2/2008 | |

OTHER PUBLICATIONS

Translation of Ono (JP2000-201455) dated Jul. 2000.*

* cited by examiner

F I G. 3
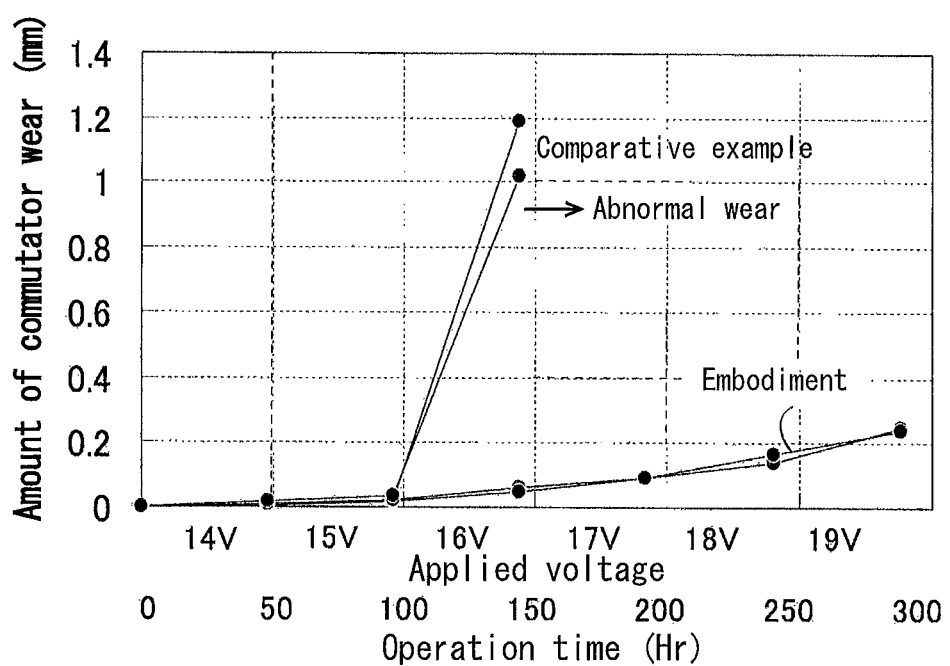

CARBON BRUSH FOR FUEL PUMP AND METHOD FOR MANUFACTURING SAME

CROSS-REFERENCE TO RELATED APPLICATIONS

This application is the United States national phase under 35 U.S.C. §371 of International Application No. PCT/JP2011/079067 filed Dec. 15, 2011, entitled "Carbon Brush for Fuel Pump and Method for Manufacturing Same", and claims priority under 35 U.S.C. §119(a)-(d) to Japanese Patent Application No. 2011-014803 filed on Jan. 27, 2011 in the Japanese Intellectual Property Office, the disclosures of which are hereby incorporated by reference in their entireties.

BACKGROUND OF THE INVENTION

1. Field of the Invention

The present invention relates to a carbon brush for a fuel pump, and to a method for manufacturing the same.

2. Description of the Related Art

A carbon brush for use in liquid fuel is incorporated in a fuel pump motor and slides against a commutator serving as the sliding partner in the liquid fuel. Electrical contact is unstable with a carbon brush for a fuel pump since liquid fuel exists between the brush and the commutator. For this reason, sparks are likely to be produced between the brush and the commutator, and the production of sparks is significant particularly at the back end of sliding when the brush and a commutator segment separate from each other. With conventional carbon brushes, phenol resin as the binder becomes almost entirely carbonized due to being fired at a high temperature, and the carbon particles that are a main component of the brush composition are bound with the phenol resin carbide. When sparks are produced, the phenol resin carbide undergoes fire damage due to the sparks, resulting in the dropout of carbon particles and wear of the brush.

Since the production of sparks is low when the fuel pump motor operates with a low voltage, wear is also not very significant, but when a certain voltage is exceeded, carbon dropout increases rapidly, surface abrasion occurs at the back end of sliding, and roughness increases. When this happens, sparks are more likely to be produced, surface abrasion becomes more significant, and the brush rapidly becomes more worn. As described above, when the fuel pump motor is operated at a high voltage under a high load, so-called abnormal wear occurs, that is to say, the brush becomes abnormally worn in a short time. Since the lifetime of the brush and the commutator is one of the important functions of a fuel pump, abnormal wear needs to be reliably eliminated. There is demand for fuel pump motors of recent years to be small and have a high fuel pressure, and therefore such fuel pump motors are often operated under a high load so as to rotate more quickly. For this reason, there is a rise in the risk of abnormal wear occurring, which is a point of great concern in design.

As an example of related art, Patent Document 1 (JP 2007-300748A) discloses the suppression of commutation sparks by adding 1 to 10 wt % of $TiO_2$ to a carbon brush for a fuel pump. Also, Patent Document 2 (JP 2008-43028A) discloses the suppression of commutation sparks by adding 5 to 30 wt % of montmorillonite or fibrous potassium titanate to a carbon brush. However, through experiments performed by the inventors of the present application, it was revealed that the prevention of abnormal wear when a fuel pump motor is operated at a high voltage is insufficient with the carbon brushes of Patent Documents 1 and 2.

CITATION LIST

Patent Document

Patent Document 1: JP 2007-300748A
Patent Document 2: JP 2008-43028A

SUMMARY OF THE INVENTION

An object of the present invention is to provide a carbon brush in which abnormal wear does not occur even if a fuel pump motor is operated at a high voltage.

The present invention relates to a carbon brush for a fuel pump that includes a brush body and a lead wire connected to the brush body, the brush body including carbon and polyether ether ketone (PEEK [-O-φ-O-φ-CO-φ]n: φ being a benzene ring, and n being the degree of polymerization of approximately 100 to 1000, for example). Polyether ether ketone is a highly heat-resistant thermoplastic resin having a melting point of 334° C. and a glass-transition point of 143° C. Due to being highly heat-resistant, polyether ether ketone is not-likely to undergo fire damage due to spark discharges between it and a commutator. For this reason, when polyether ether ketone is contained in a carbon brush for a fuel pump, it is possible to prevent abnormal wear of the brush and raise the durability of the brush. Also, the polyether ether ketone in the brush body preferably has a contained amount in a range of 5 wt % to 30 wt % inclusive. When lower than 5 wt %, durability is lacking due to insufficient brush strength, and when over 30 wt %, the electrical conductivity of the brush decreases. Although the carbon in the brush body may be artificial graphite such as electrographite, or amorphous carbon, it is preferable that it is natural graphite, which is inexpensive and has superior sliding characteristics.

The polyether ether ketone has an average particle diameter in a range of 5 μm to 50 μm inclusive, for example, but is preferably in a range of 15 μm to 35 μm inclusive, or most preferably in a range of 20 μm to 30 μm inclusive. Since polyether ether ketone binds carbon particles with each other, excessively large particles are inefficient as binders. For this reason, the average particle diameter is preferably less than or equal to 50 μm, preferably less than or equal to 35 μm, and particularly preferably less than or equal to 30 μm. The optimum value of the average particle diameter of the polyether ether ketone is in the vicinity of 25 μm, and the average particle diameter is preferably greater than or equal to 15 μm, and particularly preferably greater than or equal to 20 μm.

Polyether ether ketone with an average particle diameter that is too small will be insufficient in terms of capability to prevent abnormal wear, and polyether ether ketone with an average particle diameter that is too large will be inefficient as a binder. In view of this, the powder mixture that is compression molded includes carbon and polyether ether ketone that preferably has an average particle diameter in a range of 15 μm to 35 μm inclusive, and particularly preferably has an average particle diameter in a range of 20 μm to 30 μm inclusive.

The present invention also relates to a method for manufacturing a carbon brush for a fuel pump that includes a brush body and a lead wire connected to the brush body, including a step for manufacturing the brush body by compression molding a powder mixture having carbon and polyether ether ketone as main components, and performing firing at a temperature in a range of 334° C. to 500° C. inclusive, 334° C.

being the melting point of polyether ether ketone. Note that the compression molding and the firing may be performed in the same mold, or the brush body may be removed from the mold for compression molding and fired in a different step, and the firing atmosphere is any atmosphere such as air, nitrogen, or a reducing atmosphere. Although polyether ether ketone undergoes substantially no decomposition when fired at 500° C. or less, the firing temperature is preferably greater than or equal to 334° C., which is the melting point, and less than or equal to 400° C.

The present invention enables preventing abnormal wear of a carbon brush for a fuel pump and improving fuel pump reliability.

BRIEF DESCRIPTION OF THE DRAWINGS

FIG. 3 is a characteristics diagram showing the amount of commutator wear in an embodiment and a comparative example.

DETAILED DESCRIPTION OF THE PREFERRED EMBODIMENTS

The following describes preferred embodiments for carrying out the present invention. The present invention is not intended to be limited to the embodiments, but rather is based on the claims, and the embodiments may be modified by the addition of common knowledge of a person skilled in the art.

8 wt % of PEEK (polyether ether ketone) resin having an average particle diameter of 25 μm is combined with 92 wt % of natural graphite powder having an average particle diameter of 30 μm, and the combination is homogeneously-mixed with a blender, thus obtaining a powder mixture. This powder mixture is molded at a pressure of $3 \times 10^4$ N/cm² with a powder compression molding machine, the molded powder mixture is removed from the mold and heated at 350° C. (the period held at the maximum temperature being 60 minutes) in the air, thus obtaining a brush material.

Figure 1:
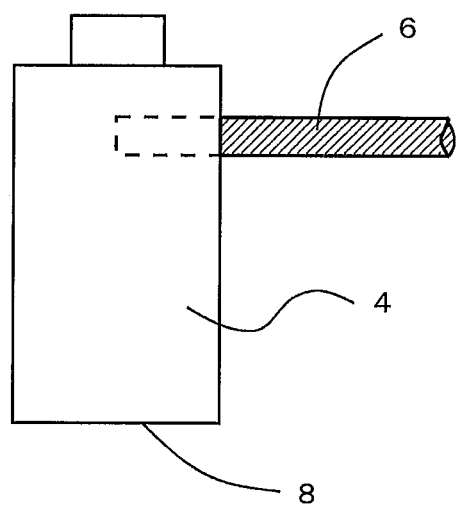
FIG. 1 is a front view of a carbon brush according to an embodiment.

This brush is worked into the shape shown in FIG. 1 using a cutting machine, and a lead wire is attached using copper powder fixing, thus obtaining a completed brush product. PEEK is a thermoplastic resin having a [-O-φ-O-φ-CO-φ]n (φ being a benzene ring) structure, having a melting point of 334° C., and having a glass-transition point of 143° C. When fired at 350° C., the PEEK particles melt and connect the natural graphite particles to each other. The firing atmosphere is arbitrary, and the maximum temperature during firing is greater than or equal to 334° C., which is the melting point of PEEK, and is preferably less than or equal to 500° C., and particularly preferably less than or equal to 400° C. in order to prevent thermal decomposition of PEEK. Also, the contained amount of PEEK is preferably in the range of 5 wt % to 30 wt % inclusive relative to the brush body, and the carbon is preferably natural graphite, but may be amorphous carbon or artificial graphite such as electrographite. The firing temperature is preferably greater than or equal to 334° C., which is the melting point of polyether ether ketone, and less than or equal to 500° C., and particularly preferably is greater than or equal to the melting point of polyether ether ketone and less than or equal to 400° C. FIG. 1 shows the structure of a carbon brush 2, where 4 indicates the aforementioned brush body, 6 indicates the lead wire, and 8 indicates a sliding face that slides against a commutator.

A carbon brush according to a comparative example was manufactured. 80 wt % of natural graphite powder having an average particle diameter of 30 μm was dissolved in methanol along with 20 wt % of phenol resin varnish relative to the 80 wt % of natural graphite, the solution was mixed with a mixer, dried, pulverized, and passed through a sieve having 198-μm openings, thus obtaining a powder mixture. This powder mixture was molded at a pressure of $3 \times 10^4$ N/cm² with a powder compression molding machine, and the molded powder mixture was fired by being heated at 800° C. in a reducing atmosphere with an electric furnace, thus obtaining a brush material. Other aspects of the carbon brush according to the comparative example were similar to those of the carbon brush according to the embodiment.

The carbon brushes according to the embodiment and the comparative example were subjected to experimentation under the following conditions. Each carbon brush was integrated in a fuel pump motor that includes a carbon commutator, and then the motor was integrated in a fuel pump. First, a voltage of 14 V was applied to the fuel pump immersed in regular gasoline, and the fuel pump was operated while raising the voltage by 1 V every 48 hours and applying a constant voltage for each 48 hour period. The experiment was performed using two pumps, with a final applied voltage of 19 V and a total operation time of 288 hours. The motors were temporarily stopped every 48 hours, and the amount of carbon brush wear and the amount of commutator wear were measured. The amount of carbon brush wear is shown in FIG. 2, and the amount of commutator wear is shown in FIG. 3.

Figure 2:
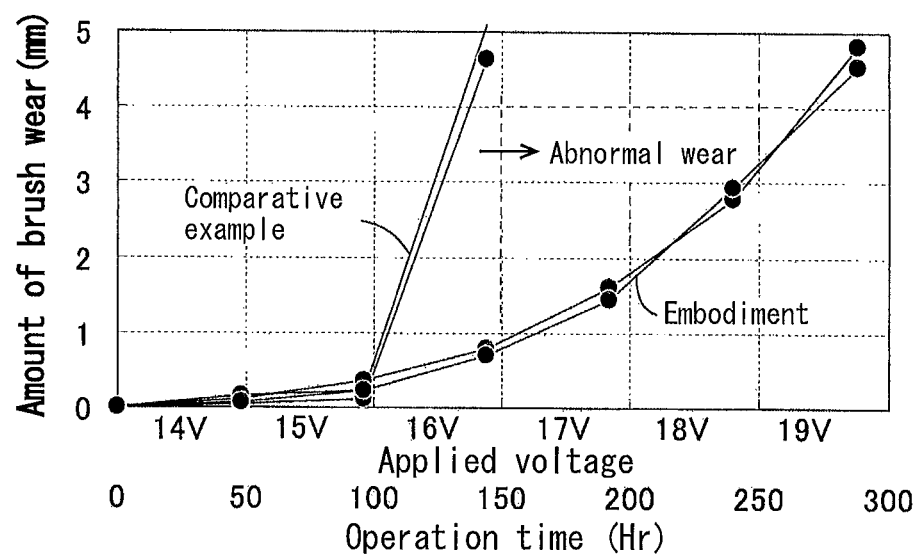
FIG. 2 is a characteristics diagram showing the amount of carbon brush wear in an embodiment and a comparative example.

As is clear from FIGS. 2 and 3, with the comparative example, when a voltage of 16 V or higher was applied to the fuel pump motor, abnormal wear occurred with both the carbon brush and the commutator. With the embodiment, the amount of carbon brush wear and the amount of commutator wear rose over time, but did not reach the abnormal wear level. It was found that using polyether ether ketone as the binder in this way enables preventing abnormal wear when operating a fuel pump motor at a high voltage under a high load.

LIST OF REFERENCE NUMERALS

2 Carbon brush
4 Brush body
6 Lead wire
8 Sliding face

What is claimed is:

1. A carbon brush for a fuel pump comprising a brush body and a lead wire connected to the brush body, the brush body having natural graphite and polyether ether ketone as main components,
  wherein the polyether ether ketone in the brush body has a contained amount in a range of 5 wt % to 30 wt % inclusive.

2. The carbon brush for a fuel pump according to claim 1, wherein the polyether ether ketone has an average particle diameter of 15 to 35 μm.

3. The carbon brush for a fuel pump according to claim 1, the brush body consisting essentially of natural graphite and polyether ether ketone.

4. A liquid fuel pump motor comprising the carbon brush of claim 1.

5. The liquid fuel pump motor of claim 4, wherein the brush body consists essentially of natural graphite and polyether ether ketone.

6. The liquid fuel pump motor of claim 4, wherein the carbon brush is configured to slide along a carbon commutator of the liquid fuel pump motor.

7. A method for manufacturing a carbon brush for a fuel pump comprising a brush body and a lead wire connected to the brush body, comprising: a step for manufacturing the brush body by compression molding a powder mixture having natural graphite and polyether ether ketone as main components, and performing firing at a temperature in a range of 334° C. to 500° C. inclusive,
  wherein the polyether ether ketone in the brush body has a contained amount in a range of 5 wt % to 30 wt % inclusive.

8. The method for manufacturing a carbon brush for a fuel pump according to claim 7, wherein the powder mixture including natural graphite and polyether ether ketone having an average particle diameter of 15 to 35 μm is compression molded.

9. The method for manufacturing a carbon brush for a fuel pump according to claim 7, the powder mixture consisting essentially of natural graphite and polyether ether ketone.

* * * * *